US008780461B2

(12) United States Patent
Watanabe

(10) Patent No.: US 8,780,461 B2
(45) Date of Patent: Jul. 15, 2014

(54) OPTICAL LENS AND LENS UNIT USING THE SAME

(75) Inventor: Hiroshi Watanabe, Sukagawa (JP)

(73) Assignee: Kantatsu Co., Ltd., Yaita-shi (JP)

( * ) Notice: Subject to any disclaimer, the term of this patent is extended or adjusted under 35 U.S.C. 154(b) by 323 days.

(21) Appl. No.: 13/103,326

(22) Filed: May 9, 2011

(65) Prior Publication Data

US 2011/0279913 A1    Nov. 17, 2011

(30) Foreign Application Priority Data

May 17, 2010  (JP) .................. 2010-112985

(51) Int. Cl.
G02B 9/00       (2006.01)
G02B 13/00      (2006.01)

(52) U.S. Cl.
CPC .................................... *G02B 13/00* (2013.01)
USPC ....................................................... 359/740

(58) Field of Classification Search
USPC ................. 359/728, 733, 738–740
See application file for complete search history.

(56) References Cited

U.S. PATENT DOCUMENTS 8,320,059 B2 *   11/2012   Lin .............................. 359/740

FOREIGN PATENT DOCUMENTS

| JP | 2002-286987 A | 10/2002 |
| JP | 2004-246258 A | 9/2004 |
| JP | 2005-532589 A | 10/2005 |
| JP | 2010-032902 A | 2/2010 |
| WO | 2004/005977 A1 | 1/2004 |

OTHER PUBLICATIONS

Japanese Office Action dated Feb. 26, 2014, issued in corresponding Japanese Patent Application No. 2010-112985 (2 pages).

* cited by examiner

*Primary Examiner* — Jack Dinh
(74) *Attorney, Agent, or Firm* — Westerman, Hattori, Daniels & Adrian, LLP

(57) ABSTRACT

An annular inclined surface is formed on an edge portion of a first plastic lens in such a manner that the inclined surface surrounds a concave surface formed in a second surface of the first plastic lens. The inclined surface reflects unwanted light reflected by the concave surface so as to prevent the unwanted light from passing through the non-shading portion of the edge portion outside the effective area of a lens portion and then being reflected on an imaging area. This can suppress ghosting and flare due to the reflection of the unwanted light on the imaging surface.

4 Claims, 5 Drawing Sheets

OPTICAL LENS AND LENS UNIT USING THE SAME

The present application is based on and claims priority of Japanese patent application No. 2010-112985 filed on May 17, 2010, the entire contents of which are hereby incorporated by reference.

BACKGROUND OF THE INVENTION

1. Field of the Invention

The present invention relates to an optical lens for use in small imaging devices used in small, thin electronic apparatuses such as cellular phones and personal digital assistants (PDAs), and a lens unit using the same. In particular, the invention relates to an optical lens where multiple lenses are housed in a lens barrel with the optical axes thereof aligned so that the lenses are positioned relative to each other, and a lens unit using the same.

2. Description of the Related Art

As the market for mobile terminals including an imaging device expands in recent years, a small solid-state image sensor having a larger number of pixels has been mounted on such imaging devices. With the miniaturization and pixel number increase of image sensors, it has been common to form an imaging lens unit by overlapping multiple lenses in a lens barrel.

Overlapping multiple lenses to form a lens unit requires alignment of the optical axes of the overlapped lenses. Examples of known methods for such optical axis alignment include JP-A-2002-286987. JP-A-2002-286987 discloses a method of forming plastic lenses in such a manner that the outer diameters thereof are slightly smaller than the inner diameter of a lens barrel and inserting the plastic lenses into the lens barrel while maintaining clearance therebetween in the diameter direction, as well as forming an optical axis-centered, tapered conical surface in the overlap surface of each lens and pressing the last-stage plastic lens, which is freely fit into the lens barrel, in the optical axis direction so as to fit the conical surfaces of the lenses with each other so that the last-stage lens is bonded and fixed to the lens barrel with the optical axes of the lenses aligned.

Meanwhile, when overlapping multiple lenses, part of light incident on each lens may be reflected internally within the lens, becoming unwanted light which is not conducive to image formation (hereafter simply referred to as "unwanted light"). This unwanted light may be reflected on the image sensor, causing ghosting and flare. Examples of known methods for reducing such unwanted light to reduce ghosting and flare include one disclosed in JP-A-2010-32902, which includes disposing an annular shading plate outside the effective areas of the lens portions of the lenses and interposing the shading plate between the lenses when inserting the lenses into a lens barrel. Specifically, as shown in FIG. 3, two lenses, R1 and R2, are overlapped with a shading plate L interposed therebetween. Thus, the optical path of unwanted light H reflected by a concave surface R1a of a second surface of the lens R1 is blocked by the shading plate L. This prevents the reflection of the unwanted light H on the effective area of the image sensor.

SUMMARY OF THE INVENTION

Where the edge portions of the lenses R1 and R2 are continuous flat surfaces as shown in FIG. 3, the shading plate L for blocking the unwanted light H can be interposed almost across the portions outside the lens portions of the lenses R1 and R2, that is, almost across the edge portions. On the other hand, where the core adjustment structure using the fit between the conical surfaces as shown in JP-A-2002-286987 is employed, for example, where conical surfaces K1 and K2 are formed on the edge portions of two lenses, R1 and R2, as shown in FIG. 4 or conical surfaces K1 to K4 are formed on three lenses, R1 to R3, as shown in FIG. 5A or FIG. 5B and then the conical surfaces K1 and K2 or conical surfaces K1 to K4 (hereafter referred to as "conical surfaces K1 and K2 (K1 to K4)") are fitted with each other to align the optical axes of the lenses R1 and R2 (R1 to R3), steps including the conical surfaces K1 and K2 (K1 to K4) are made on the edge portions of the lenses R1 and R2 (R1 to R3). This makes it difficult to dispose the shading plate L outside the conical surfaces K1 and K2 (K1 to K4).

That is, when attempting to dispose the shading plate L between the edge portions having thereon the steps including the conical surfaces K1 and K2 (K1 to K4), the shading plate L is disposed separately between the edge portions inside the conical surfaces K1 and K2 (K1 to K4) and between the edge portions outside them. However, in combining the lenses R1 and R2 with the shading plate L positioned relative to the lens R1 and R2 (R1 to R3), the conical surfaces K1 and K2 (K1 to K4) are used as references for positioning. In positioning the shading plate L inside the conical surfaces K1 (FIG. 4), K2 (FIG. 5A, FIG. 5B), and K4 (FIG. 5A), all of which are recessed in the form of steps, the peripheral corners of these conical surfaces are used as portions for positioning the outer edge of the shading plate L. On the other hand, there are no references for positioning the shading plate L outside the conical surfaces K1, K2, and K4. This prevents positioning of the shading plate L between the lenses R1 and R2 (R1 to R3) outside these conical surfaces. Further, the conical surfaces K1, and K2 (K1 to K4), which are intended to position the lenses R1 and R2 (R1 to R3) relative to each other, are shaped with high accuracy to be fitted with each other, and formation of a shading film or reflection film on these conical surfaces affects the accuracy of the positioning using the conical surfaces. Thus, it is also difficult to form a shading film or the like on the conical surfaces K1 and K2 (K1 to K4).

For these reasons, in fitting the conical surfaces K1 and K2 (K1 to K4) with each other to align the optical axes of the lenses R1 and R2 (R1 to R3) as in JP-A-2002-286987, it is common practice to dispose the shading plate L only inside the conical surfaces K1 and K2 (K1 to K4) and not to dispose the shading plate outside the conical surfaces. Thus, the conical surfaces K1 and K2 (K1 to K4) and the portions outside the conical surfaces act as non-shading portions. Accordingly, light reflected internally by a lens portion R1a of a second surface of the lens R1 passes through the conical surfaces K1 and K2 (K1 to K4), is internally reflected by the outer edge of the lens R1, travels toward the image sensor via the non-shading portions, and reaches the image sensor as unwanted light H, which is not conducive to image formation. In particular, when light which has entered the lens R1 reaches the lens portion R1a at an incident angle greater than the critical angle, the light is totally reflected by the lens portion R1a and travels toward the edge portion rather than being refracted by the lens portion R1a and exiting from the lens R1. Thus, disadvantageously, the unwanted light H is more remarkably reflected on the effective area of the image sensor, causing ghosting and flare.

An advantage of the present invention is to provide an optical lens that employs a core adjustment structure where the optical axes of multiple lenses are aligned using conical surfaces and that can effectively reduce unwanted light which may reach an image sensor so as to reduce ghosting and flare, and a lens unit using the same.

An optical lens according to a first aspect of the present invention includes a plurality of lenses and a shading plate disposed between the lenses. The lenses each include a lens portion and an edge portion having a conical surface formed thereon. The lenses are overlapped with the optical axes thereof aligned by engaging the conical surfaces of the lenses with each other while interposing the shading plate between the lenses. The edge portion of the lenses has an annular inclined surface formed thereon. The inclined surface reflects, toward an object, light traveling toward the edge portion after reflected by the lens portion.

Light which has entered the lens reaches the lens portion, is refracted thereby, and exits therefrom. Depending on the incident angle on the lens portion, part of the light may travel toward the imaging surface after reflected by the lens portion. Such stray light causes ghosting and flare. In particular, when the incident angle is greater than the critical angle, the light is totally reflected by the lens portion rather than refracted thereby, and travels toward the edge portion of the lens rather than exiting from the lens. The light is then repeatedly reflected and reaches the imaging area of the image sensor, causing ghosting and flare. According to the first aspect of the present invention, such stray light generated through internal reflection within the lens, that is, unwanted light is reflected toward an area other than the imaging area by the inclined surface formed on the edge portion of the lens, that is, toward the object. This reduces the reflection of the unwanted light on the imaging surface, reducing ghosting and flare.

In the optical lens according to a second aspect of the present invention, the inclined surface is preferably formed between the lens portion and the conical surface in such a manner that the inclined surface surrounds the lens portion.

According to the second aspect of the present invention, the unwanted light reflected by the lens portion is reflected toward the object by the inclined surface surrounding the lens portion. This reduces the unwanted light that may pass through the non-shading portions of the conical surface and the edge portion outside the conical surface and then reach the imaging surface.

In the optical lens according to a third aspect of the present invention, a second surface adjacent to an image, of at least one of the lenses is preferably a concave surface recessed toward the object in the form of a curvature, and the inclined surface is preferably formed at a position surrounding the concave surface.

Where the second surface of the lens is a concave surface recessed toward the object in the form of a curvature, light reflected by the conical surface after entering the lens tends to become unwanted light that causes ghosting and flare. According to the third aspect of the present invention, the light reflected by the second surface of the lens is reflected by the inclined surface toward an area other than the imaging area of the imaging surface. Thus, the unwanted light that causes ghosting and flare can be efficiently reflected toward the object.

In the optical lens according to a fourth aspect of the present invention, the inclined surface is preferably formed at a position that blocks the path of light traveling toward the edge portion after entering one of the lenses, reaching the concave surface at an incident angle greater than the critical angle, and being totally reflected by the conical surface.

When light which has entered the lens reaches the concave surface at an incident angle greater than the critical angle, the light tends to be totally reflected by the concave surface, becoming unwanted light that may be reflected on the imaging area of the imaging surface and cause ghosting and flare. According to the fourth aspect of the present invention, the unwanted light is reflected by the concave surface toward an area other than the imaging area. This can effectively reduce ghosting and flare.

In the optical lens according to a fifth aspect of the present invention, at least 70% of light totally reflected by the concave surface is preferably either reflected toward the object or blocked by the inclined surface.

According to the fifth aspect of the present invention, at least 70% of light totally reflected by the concave surface is either reflected toward the object or blocked by the inclined surface. Thus, the unwanted light that causes ghosting and flare can be efficiently reflected toward the object.

A lens unit according to a sixth aspect of the present invention includes the optical lens according to any one of aspects 1 to 5 and a lens barrel housing the optical lens. The lenses are housed in the lens barrel with the optical axes thereof aligned by engaging the conical surfaces of the lenses with each other while interposing the shading plate between the lenses.

According to the sixth aspect of the present invention, the lenses are housed in the lens barrel with the optical axes thereof aligned by engaging the conical surfaces of the lenses with each other. Further, since unwanted light that cannot be blocked by the shading plate interposed between the lenses is reflected by the inclined surface toward the object, a lens unit that reduces ghosting and flare is obtained.

In the optical lens according to the present invention, conical surfaces are formed on the edge portions of multiple plastic lenses in order to position the plastic lenses relative to each other with the optical axes thereof aligned. Unwanted light generated through internal reflection within the plastic lenses is reflected by the inclined surface toward an area other than the effective imaging area of the image sensor, that is, toward an object. More specifically, the unwanted light, in particular, the unwanted light totally reflected by the concave surface is reflected toward an area other than the effective imaging area of the image sensor, that is, toward the object so as to prevent the unwanted light from passing through the non-shading portion of the edge portion outside the effective area of the lens portion and then being reflected on the imaging area. This can suppress ghosting and flare due to the reflection of the unwanted light on the imaging surface.

DETAILED DESCRIPTION OF THE PREFERRED EMBODIMENTS

Now, embodiments of the present invention will be described with reference to the accompanying drawings. Assume that an object is present in the upper parts of FIGS. 1 and 2 and an image is present in the lower parts thereof.

First Embodiment

Figure 1:
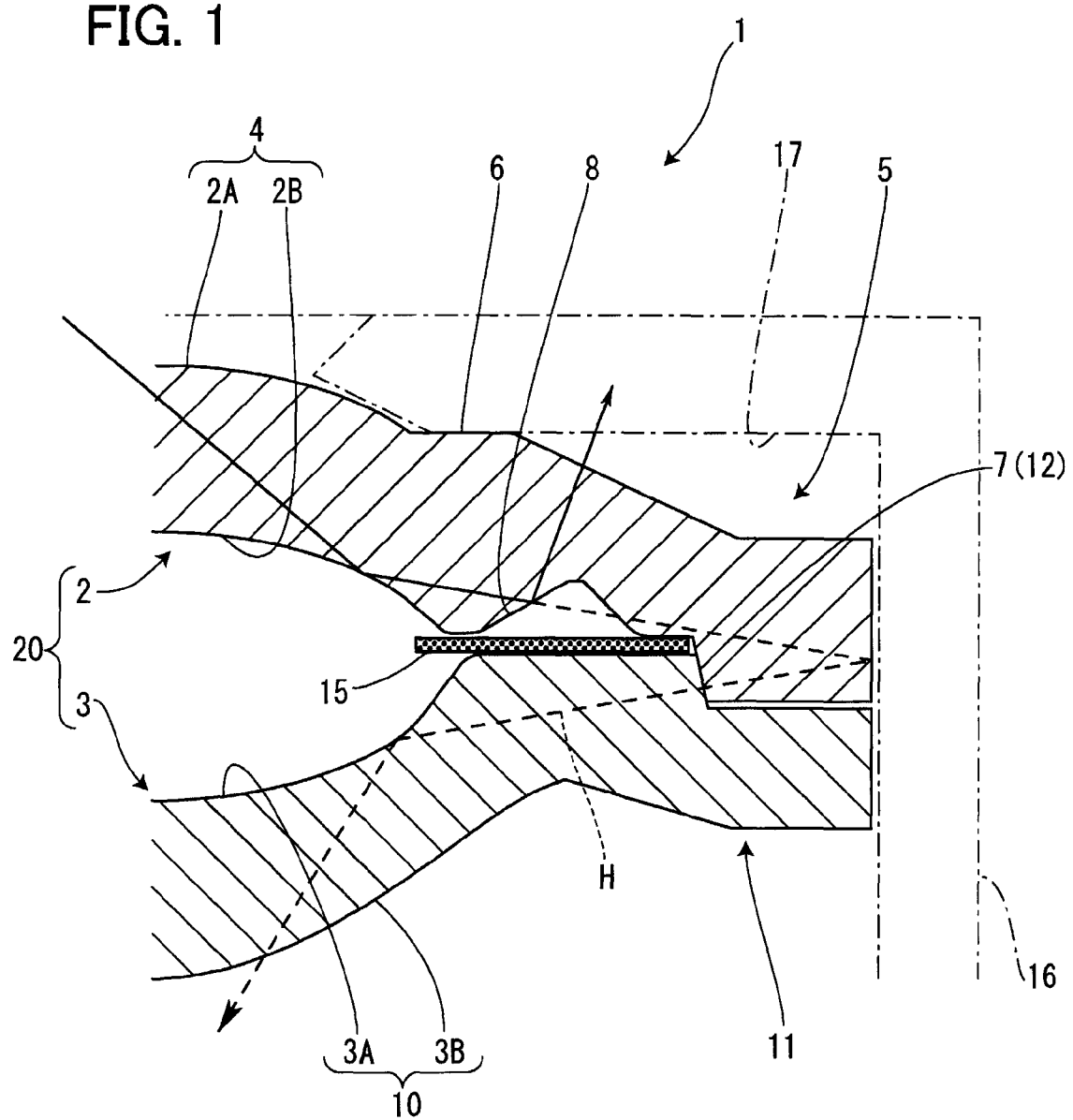
FIG. 1 is a sectional view of an optical lens according to a first embodiment of the present invention.

As shown in FIG. 1, a lens unit 20 is formed by combining two plastic lenses, first and second plastic lenses 2 and 3, and an optical lens 1 is formed by overlapping the first and second plastic lenses 2 and 3 with a shading plate 15 therebetween and inserting the overlapped plastic lenses into a cylindrical lens barrel 16.

The first plastic lens 2 includes a lens portion 4 having a convex surface 2A projecting toward the object in the form of a curved surface as a first surface adjacent to the object (in the upper part of the figure) and a concave surface 2B recessed toward the object in the form of a curved surface as a second surface adjacent to the image (in the lower part of the figure) and a flange-shaped edge portion 5 located outside the maximum effective diameter of the lens portion 4. Since the edge portion 5 is formed in such a manner that the outer diameter thereof is slightly smaller than the inner diameter of the lens barrel 16, the first plastic lens 2 is freely fit into the lens barrel 16 with clearance maintained therebetween. The edge portion 5 has a contact surface 6 formed on the side thereof adjacent to the object. The contact surface 6 is in contact with a receiving surface 17 formed on the upper surface of the lens barrel 16. The edge portion 5 also has a tapered conical surface 7 formed on the side thereof adjacent to the image. An annular inclined surface 8 is formed between the conical surface 7 and the concave surface 2B of the second surface as recessed toward the object. The inclined surface 8 reflects unwanted light H internally reflected by the concave surface 2B toward an area other than the effective imaging area of an image sensor (not shown), that is, toward the object. The inclined surface 8 formed in such a position blocks the path of light traveling toward the edge portion 5 as unwanted light H after entering the first plastic lens 2, reaching the concave surface 2B at an incident angle greater than the critical angle, and being totally reflected by the concave surface 2B. Preferably, the inclination angle of the inclined surface 8 is an angle at which the unwanted light H incident on the inclined surface 8 can be totally reflected. However, if the inclination angle is an angle at which at least 70% of the unwanted light H can be reflected or blocked, it is possible to effectively suppress ghosting and flare caused by the unwanted light H.

In contrast to the first plastic lens 2, the second plastic lens 3 includes a lens portion 10 having a concave surface 3A recessed toward the image as a first surface adjacent to the object (in the upper part of the figure) and a convex surface 3B projecting toward the image in the form of a curved surface as a second surface adjacent to the image (in the lower part of the figure) and a flange-shaped edge portion 11 located outside the maximum effective diameter of the lens portion 10. Since the edge portion 11 is formed in such a manner that the outer diameter thereof is slightly smaller than the inner diameter of the lens barrel 16, the second plastic lens 3 is freely fit into the lens barrel 16 with clearance maintained therebetween. The edge portion 11 of the second plastic lens 3 has thereon a tapered conical surface 12 located adjacent to the object and fitted with the conical surface 7. The conical surfaces 7 and 12 are fitted with each other, with the shading plate 15 interposed between the first and second plastic lenses 2 and 3 within the conical surfaces 7 and 12. Thus, the first and second plastic lenses 2 and 3 are incorporated into the lens barrel 16 with the optical axes thereof aligned.

In this embodiment, the conical surfaces 7 and 12 are formed at the same inclination angle so as to be fitted with each other. Alternatively, the first and second plastic lenses 2 and 3 may be positioned relative to each other by forming the upper conical surface 7 in such a manner that it has a more obtuse angle than the lower conical surface 12, drawing the upper corner of the lower conical surface 12 into the inside surface of the upper conical surface 7 when overlapping the first and second plastic lenses 2 and 3, and engaging the upper corner of the conical surface 12 with the inside surface of the conical surface 7 in a line contact state. That is, the first and second plastic lenses 2 and 3 may be positioned relative to each other by engaging the conical surfaces 7 and 12 with each other rather than fitting them with each other. There is no limit to the way the first and second plastic lenses 2 and 3 are positioned relative to each other using the conical surfaces 7 and 12.

Next, the flare/ghosting reduction effect of the inclined surface 8 formed on the first plastic lens 2 will be described. The optical lens 1 according to the present invention is used as an imaging device for use in cellular phones. The lens unit 20 is optically designed using the effective angle of view of an image sensor (not shown) incorporated into an imaging device. Specifically, the lens unit 20 is designed so that the optical refraction index or curvature radius of the first and second plastic lenses 2 and 3 forming the lens unit 20 is set and that light which has entered the lens unit 20 at an incident angle within the effective angle of view reaches the imaging surface of the image sensor and thus a desired image is obtained.

As shown by a broken line in FIG. 1, when light which has entered the first plastic lens 2 reaches the concave surface 2B formed on the second surface thereof, the light is refracted by the concave surface 2B and exits from the first plastic lens 2. However, depending on the incident angle on the concave surface 2B, part of the light is reflected by the concave surface 2B, then repeatedly reflected internally within the first and second plastic lenses 2 and 3, and travels toward the imaging surface. Such stray light causes ghosting and flare. In particular, when the incident angle is greater than the critical angle, the light is totally reflected by the concave surface 2B rather than refracted thereby. The light totally reflected by the concave surface 2B travels toward the edge portion 5 of the first plastic lens 2 rather than exiting from the first plastic lens 2. The light is then reflected by the external end surface of the edge portion 5 and reaches the imaging area of the image sensor, causing remarkable ghosting and flare. Conventionally, attempts have been made to prevent such stray light, that is, the unwanted light H from reaching the imaging surface by blocking the unwanted light H using the shading plate 15 interposed between the first and second plastic lenses 2 and 3. However, as described above, where the conical surfaces 7 and 12 are used to align the optical axes of the first and second plastic lenses 2 and 3, the shading plate 15 cannot be disposed on the conical surfaces 7 and 12 or outside them. For this reason, in this embodiment, the inclined surface 8 is formed on the edge portion 5 of the first plastic lens 2 in such a manner that it surrounds the concave surface 2B formed on the second surface of the first plastic lens 2. The inclined surface 8 reflects the unwanted light H totally reflected by the concave surface 2B toward an area other than the effective imaging area of the image sensor, that is, toward the object. Thus, it is possible to effectively reduce the reflection on the imaging surface, of the unwanted light H repeatedly reflected within the first plastic lens 2 and thus to suppress ghosting and flare caused by the reflection of the unwanted light H on the imaging surface.

As described above, in the lens unit 20 according to this embodiment, the conical surfaces 7 and 12 are formed on the edge portions 5 and 11 of the first and second plastic lenses 2 and 3 in order to position the first and second plastic lenses 2 and 3 with the optical axes thereof aligned. The unwanted light H reflected internally within the first and second plastic lenses 2 and 3 is reflected by the inclined surface 8 toward an area other than the effective imaging area, that is, toward the object. More specifically, the lens unit 20 reflects the unwanted light H, in particular, the unwanted light H totally reflected by the concave surface 2B toward an area other than the effective imaging area of the imaging area, that is, toward the object so as to prevent the unwanted light H from passing through the non-shading portions of the edge portions 5 and 11 located outside the effective imaging areas of the lens portions 4 and 10 of the first and second plastic lenses 2 and 3 and then being reflected on the imaging area. This can suppress ghosting and flare due to the reflection of the unwanted light H on the imaging surface.

Second Embodiment

Figure 2:
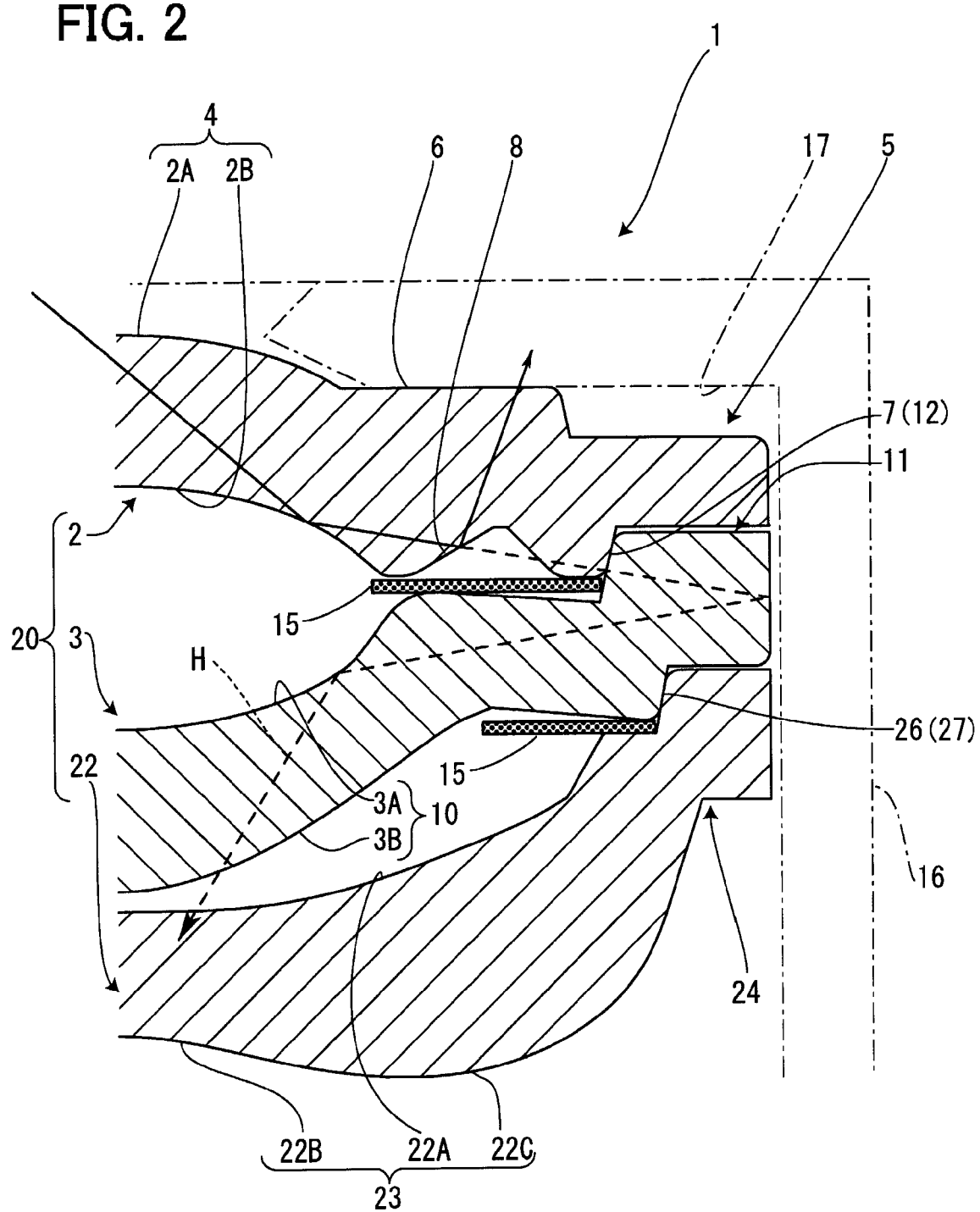
FIG. 2 is a sectional view of an optical lens according to a second embodiment of the present invention.
Figure 3:
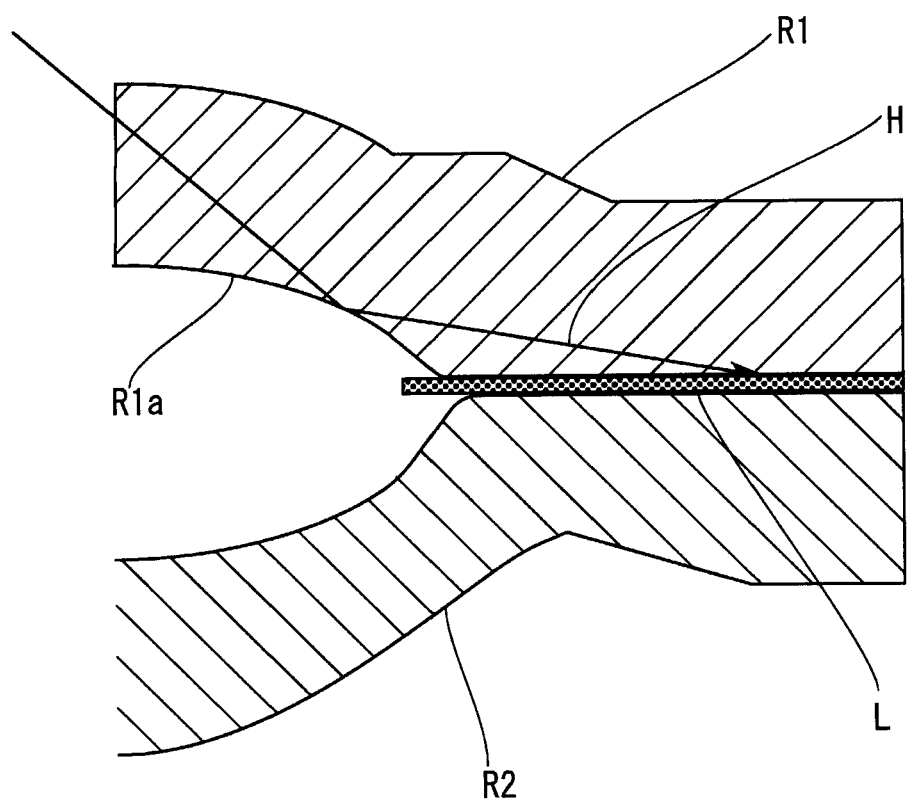
FIG. 3 is a sectional view showing the function of a shading plate of a conventional two-piece optical lens.
Figure 4:
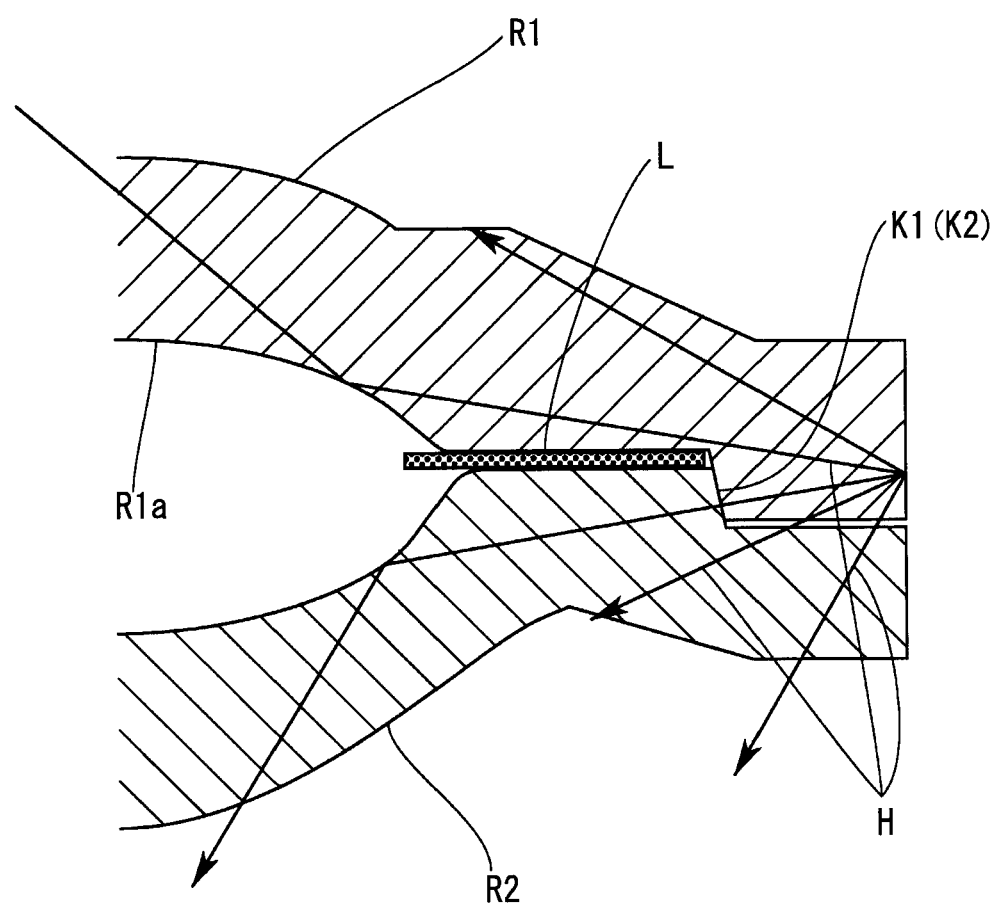
FIG. 4 is a sectional view showing the path of unwanted light in a conventional two-piece optical lens employing a core adjustment structure using conical surfaces.
Figure 5A:
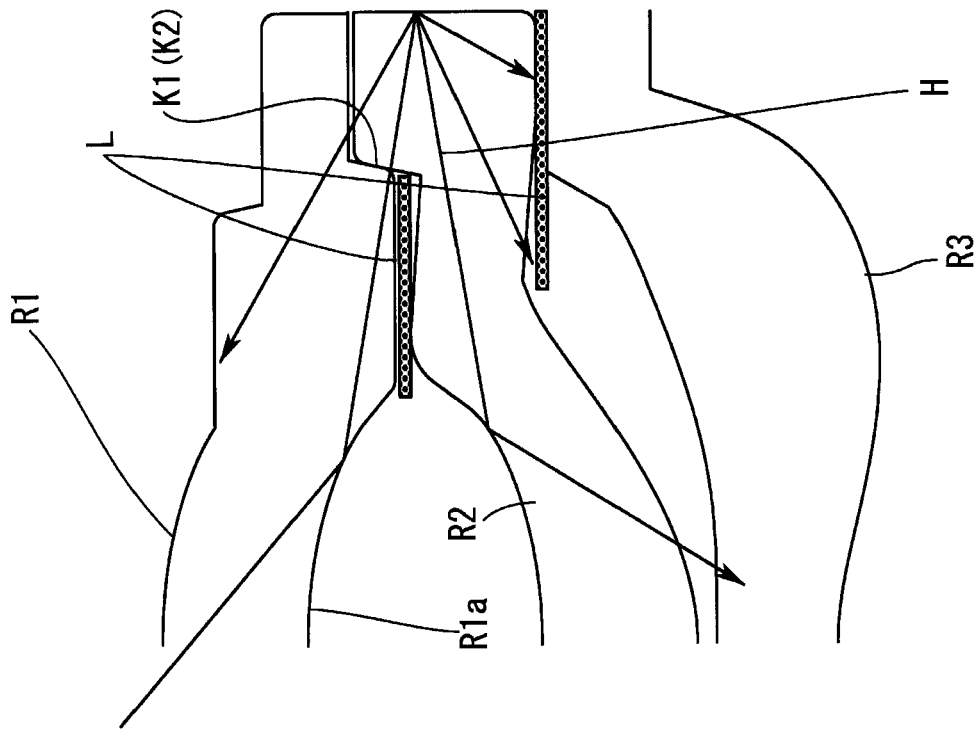
FIG. 5 is a sectional view showing the path of unwanted light in a conventional three-piece optical lens employing a core adjustment structure using conical surfaces.
Figure 5B:
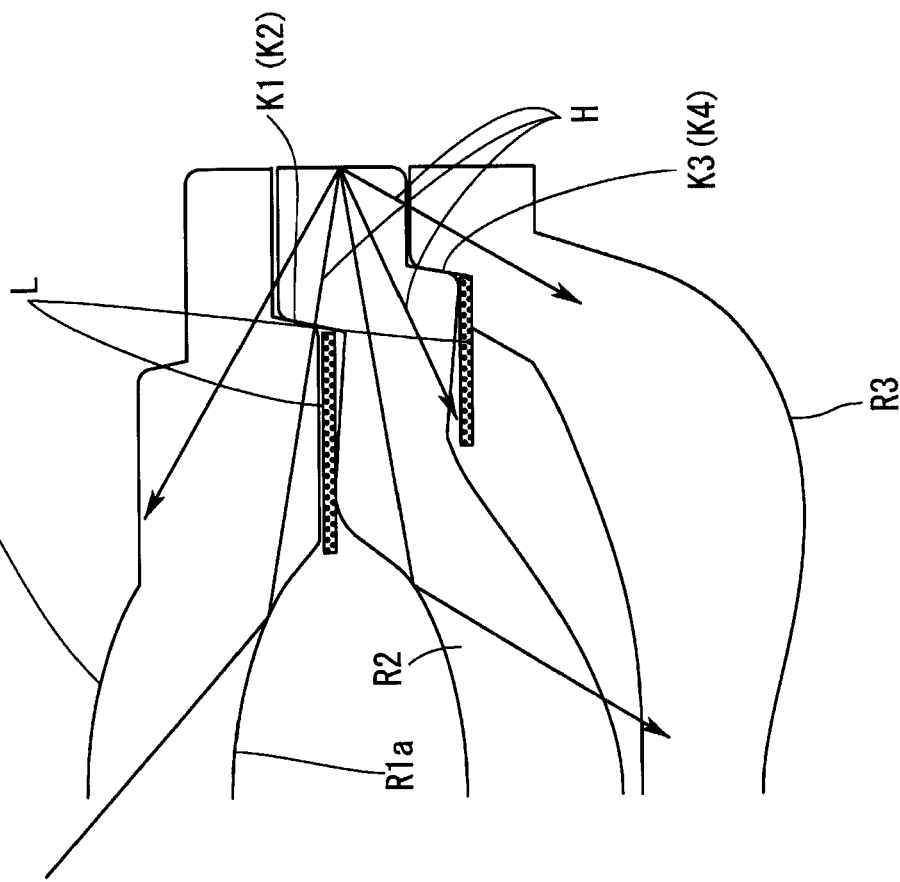

FIG. 2 shows a second embodiment of the present invention. Same components as those of the first embodiment are assigned same reference numerals and will not be described repeatedly. Only different elements will be described. This embodiment is substantially the same as the first embodiment except that the lens unit 20 includes three lenses, that is, the first and second plastic lenses 2 and 3 as well as a third lens 22.

The third plastic lens 22 includes a lens portion 23 having a concave surface 22A recessed toward an object in the form of a curved surface as a first surface adjacent to the object (in the upper part of the figure), a concave surface 22B having an inflection point and recessed toward the object in the form of a curved surface as a second surface adjacent to an image (in the lower part of the figure), and a convex surface 22C projecting toward the object in the form of a curved surface and a flange-shaped edge portion 24 located outside the maximum effective diameter of the lens portion 23. The concave surfaces 22B and 22C are formed continuously. Since the edge portion 24 is formed in such a manner that the outer diameter thereof is slightly smaller than the inner diameter of the lens barrel 16, the third plastic lens 22 is freely fit into the lens barrel 16 with clearance maintained therebetween. A tapered conical surface 27 fitted with a conical surface 26 formed on the side adjacent to the image, of the second plastic lens 3 is formed on the side adjacent to the object, of the edge portion 24. A shading plate 15 is interposed between the second plastic lens 3 and the third plastic lens 22 inside the conical surface 27.

In this embodiment thus configured, the conical surfaces 7, 12, 26, and 27 formed on the first to third plastic lenses 2, 3, and 22 are tapered conical surfaces centering on the optical axis. When overlapping the first to third plastic lenses 2, 3, and 22, the conical surfaces 7, 12, 26, and 27 are fitted with each other. Thus, the first to third plastic lenses 2, 3, and 22 are positioned relative to each other with the optical axes thereof aligned. The shading plates 15 are interposed between the first to third plastic lenses 2, 3, and 22 inside the conical surfaces 7, 12, 26, and 27. Although non-shading portions are present in the edge portions 5, 11, and 24 located outside the conical surfaces 7, 12, 26, and 27, unwanted light H internally reflected within the first plastic lens 2 is reflected toward the object by the inclined surface 8, as in the first embodiment. More specifically, the unwanted light H, in particular, the unwanted light H totally reflected by the concave surface 2B is reflected toward an area other than the effective imaging area of the image sensor, that is, toward the object so as not to pass through the non-shading portions of the edge portions 5, 11, and 24 located outside the effective areas of the lens portions 4, 10, and 23 of the first to third plastic lenses 2, 3, and 22 and then be reflected on the imaging area. This can suppress ghosting and flare due to the reflection of the unwanted light H on the imaging surface.

While the embodiments of the present invention have been described in detail, the invention is not limited thereto. Various modifications can be made to the embodiments without departing from the spirit and scope of the invention. For example, the basic configuration such as the shape of each lens or the number of lenses may be determined as appropriate. Further, the inclined surface for reflecting unwanted light may be formed on the second lens or third lens. That is, the inclined surface may be formed at any position as long as the inclined surface can reflect unwanted light reflected by the second surface of the plastic lens toward the object. Furthermore, if a reflection member is formed on the inclined surface, unwanted light which may be reflect on the imaging surface can be more reliably reflected toward an area other than the effective area of the imaging surface.

What is claimed is:

1. An optical lens comprising:
a plurality of lenses, each lens including:
a lens portion; and
an edge portion having a conical surface formed thereon; and
a shading plate disposed between the lenses, wherein
the lenses are overlapped with the optical axes thereof aligned by engaging the conical surfaces of the lenses with each other while interposing the shading plate between the lenses,
the edge portion of the lenses has an annular inclined surface formed thereon, the inclined surface reflecting, toward an object, light traveling toward the edge portion after reflected by the lens portion,
a second surface adjacent to an image, of at least one of the lenses is a concave surface recessed toward the object in the form of a curvature,
the inclined surface is formed at a position surrounding the concave surface,
the inclined surface is formed between the lens portion and the conical surface in such a manner that the inclined surface surrounds the lens portion, and
the inclined surface is recessed toward the object.

2. The optical lens according to claim 1, wherein
the inclined surface is formed at a position that blocks the path of light traveling toward the edge portion after entering one of the lenses, reaching the concave surface at an incident angle greater than the critical angle, and being totally reflected by the conical surface.

3. The optical lens according to claim 2, wherein
at least 70% of light totally reflected by the concave surface is either reflected toward the object or blocked by the inclined surface.

4. A lens unit comprising:
the optical lens according to any one of claims 1, 2, and 3; and
a lens barrel housing the optical lens, wherein
the lenses are housed in the lens barrel with the optical axes of the lenses aligned by engaging the conical surfaces of the lenses with each other while interposing the shading plate between the lenses.

* * * * *